United States Patent
Mueller et al.

(10) Patent No.: US 9,989,060 B2
(45) Date of Patent: Jun. 5, 2018

(54) FUEL SYSTEM WITH LIQUID RING PUMP WITH CENTRIFUGAL AIR/FUEL SEPARATOR

(71) Applicants: Austin Wade Mueller, Clinton, WI (US); Dmitriy Baryshnikov, Rockford, IL (US)

(72) Inventors: Austin Wade Mueller, Clinton, WI (US); Dmitriy Baryshnikov, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 1228 days.

(21) Appl. No.: 13/962,043

(22) Filed: Aug. 8, 2013

(65) Prior Publication Data
US 2015/0044016 A1 Feb. 12, 2015

(51) Int. Cl.
*F04D 9/02* (2006.01)
*B01D 19/00* (2006.01)
*F04C 19/00* (2006.01)
*F04D 5/00* (2006.01)

(52) U.S. Cl.
CPC ........... *F04D 9/02* (2013.01); *B01D 19/0057* (2013.01); *F04C 19/001* (2013.01); *F04C 19/004* (2013.01); *F04D 5/002* (2013.01); *F04C 2210/1044* (2013.01); *F05B 2210/132* (2013.01)

(58) Field of Classification Search
CPC . F04D 5/002; F04D 9/02; F04D 9/003; F05B 2210/132
USPC .................................................. 415/1, 169.2
See application file for complete search history.

(56) References Cited

U.S. PATENT DOCUMENTS

| | | | |
|---|---|---|---|
| 1,920,484 A | 8/1933 | Siemen et al. | |
| 2,677,236 A * | 5/1954 | Grinsted | F02C 3/26 60/39.464 |
| 2,677,237 A * | 5/1954 | Voysey | F02C 3/26 60/39.461 |
| 2,811,219 A | 10/1957 | Wenzl | |
| 2,983,331 A | 5/1961 | Helsley, Jr. | |
| 3,002,463 A | 10/1961 | Lahti | |
| 3,007,417 A | 11/1961 | Feltus | |
| 4,691,510 A | 9/1987 | Taylor et al. | |
| 4,804,313 A | 2/1989 | Nasvytis | |

(Continued)

FOREIGN PATENT DOCUMENTS

GB 2331125 A * 5/1999 ............. F04D 7/045

*Primary Examiner* — Sean J Younger
(74) *Attorney, Agent, or Firm* — Reinhart Boerner Van Deuren P.C.

(57) ABSTRACT

A fuel system incorporating a boost pump unit, a boost pump unit and method of pumping fuel are provided. The fuel system and boost pump unit are preferably self-priming and do not utilize an airframe mounted pump for supplying fuel for an aircraft combustor. The boost pump unit includes a liquid ring pump and an air/fuel separator. The air/fuel separator has an inlet and first and second outlet ports. The inlet is operably fluidly coupled to an outlet of the liquid ring pump. The air/fuel separator has an arcuate flow path. The first outlet port is in fluid communication with a radially outer portion of the arcuate flow path and the second outlet port is in fluid communication with a radially inner portion of the arcuate flow path. A return line connected to the first outlet port is configured to return fuel to the liquid ring pump.

20 Claims, 2 Drawing Sheets

(56) References Cited

U.S. PATENT DOCUMENTS

| | | | | |
|---|---|---|---|---|
| 4,877,377 | A | * | 10/1989 | Taylor .................... F02C 7/236 417/87 |
| 4,883,410 | A | * | 11/1989 | Goddard .................. F02C 7/22 244/135 R |
| 5,096,386 | A | | 3/1992 | Kassel |
| 6,054,165 | A | * | 4/2000 | Koellner ............... A23L 3/0155 426/524 |
| 2004/0003593 | A1 | * | 1/2004 | Sauer ....................... F01K 9/02 60/670 |
| 2008/0099619 | A1 | * | 5/2008 | Diaks .................... B64D 37/00 244/135 R |

* cited by examiner

FUEL SYSTEM WITH LIQUID RING PUMP WITH CENTRIFUGAL AIR/FUEL SEPARATOR

FIELD OF THE INVENTION

This invention generally relates to fuel systems, more particularly to fuel systems for aircraft and more particularly to fuel systems for rotary wing aircraft.

BACKGROUND OF THE INVENTION

In rotary wing aircraft, the engines are typically mounted in the top part of the aircraft while the fuel tanks are typically located in the bottom part. During operation, the engine main fuel pump has to lift the fuel from the tank. Gravity and inertial forces acting on the fuel substantially reduce the pressure at the inlet of the engine mounted fuel pump below the fuel pressure in the tank, resulting in detrimental conditions for pump suction. The fuel pressure reduces even more when the aircraft flies at altitude, and the ambient air and tank pressures drop. The engine fuel boost pump has to possess exceptional suction capability to be able to induce the fuel from the inlet line at very low inlet pressures. In addition to this effect, due to rapid reduction in fuel pressure, the air, naturally dissolved in the fuel, evolves and travels toward the pump in form of air bubbles. Therefore, the fuel pump, in addition to its ability to induce the fuel at very low pressures, must also be able to induce air-fuel mixtures with high air content.

For some rotary wing aircraft applications, the inlet line geometry and the operating conditions act to separate air bubbles from the fuel stream creating a non-homogeneous mixture of air and fuel, which can be in the form of intermittent air bubbles or a relatively large bubble of air. For the boost pump to meet these air handling requirements, the boost pump must be able to compress air. Further, the boost pump must be incorporated into a fuel system that can store the compressed air bubble and can prevent it from reaching the inlet to the main fuel pump.

Another challenge for an engine mounted fuel pump in rotary wing aircraft is priming during initial engine start. There are several factors—such as initial (new) engine start, start following any engine fuel system component replacement, or minor leakage in the inlet fuel line—can cause the inlet fuel line to be empty of fuel prior the engine start. Many rotary wing aircraft do not incorporate any special equipment to fill the line with fuel and aid pump priming. Therefore, the engine mounted fuel pump has to be able to prime itself during engine start, including events when the inlet fuel line is empty.

Previous systems have applied centrifugal and regenerative impellers in the boost pump. Both of these impeller styles have limited to no ability to compress an air bubble at the inlet into a downstream cavity and are thus not able to pump non-homogeneous mixtures of air and fuel and are not self-priming.

Industrial applications, i.e. non-aircraft environments, have attempted to meet air pumping requirements by utilizing a side channel liquid ring pump. This type of pump is a hybrid that is able to provide pressures when operating on solid fuel that are on par with regenerative pumps but also has the capability to compress air.

When pumping air in a liquid ring pump, centrifugal forces separate the fuel and air (or vapor during low suction pressure conditions). The heavier fuel particles are flung to the outer diameter while the air bubbles collect near the impeller hub. A pressure gradient is established with the pressure in the channel at the outer diameter are greater than the pressure at the interior hub. The discharge port is located near the hub, away from the liquid ring.

The separation of air and fuel is not perfect and some fuel is lost out of the discharge port with the pumped air. As such, a fuel source is necessary to replenish the liquid ring pump to have stable performance. Otherwise, as fuel is depleted from the impeller cavity, the air compression will degrade during this priming operation. The side channel liquid ring pump is typically coupled with an inlet ejector to assist in suction conditions as well as to provide a conduit to replenish the liquid ring when pumping air during priming.

In industrial applications, to meet this need, the liquid ring pumps employ a large fuel reservoir at the discharge of the pump. The air and fuel mixture from the discharge port is separated by gravity in the reservoir. Air is pulled from the top of the reservoir and fuel is pulled from the bottom and then returned to the inlet of the pump to maintain the liquid ring. Unfortunately, this type of system is not practical for aerospace applications due to the large volume required for the air/fuel separator.

Embodiments of the present invention relate to improvements over the current state of the art.

BRIEF SUMMARY OF THE INVENTION

Embodiments of a new and improved fuel system for an aircraft, and particularly a rotary wing aircraft is provided. In one embodiment, the fuel system is self-priming and can ingest air within a supply line between the fuel system and the fuel tank.

In one embodiment, a boost pump unit for an aircraft fuel system including a liquid ring pump and an air/fuel separator is provided. The liquid ring pump has an inlet and an outlet between which fluid can be pumped. The air/fuel separator has an inlet and first and second outlet ports. The inlet is operably fluidly coupled to the outlet of the liquid ring pump. The air/fuel separator has an arcuate flow path extending from the inlet to the first and second outlet ports. The first outlet port is in fluid communication with a radially outer portion of the arcuate flow path and the second outlet port is in fluid communication with a radially inner portion of the arcuate flow path. A return line connected to the first outlet port is configured to return fuel to the liquid ring pump.

In one embodiment, the boost pump unit further comprises an inlet ejector for providing suction upstream of the liquid ring pump.

In one embodiment, the return line is in fluid communication with the inlet ejector such that flow of fuel through the return line provides the motive flow for the inlet ejector to provide suction at the pump inlet.

In one embodiment, the liquid ring pump is a side channel liquid ring pump.

In one embodiment, the boost pump unit is self-priming and configured to pump air.

In another embodiment, an engine mounted fuel system for an aircraft having a fuel tank is provided. The engine mounted fuel system includes a main fuel pump and a boost pump unit. The boost pump unit can take any form as outlined above. The boost pump unit draws fuel from the fuel tank and operably supplies, e.g. directly or indirectly, it to the main fuel pump.

In one embodiment, the fuel system includes a fuel storage volume downstream from and in fluid communication with the second outlet port of the air/fuel separator. In a particular implementation, the fuel storage volume is provided by an interstage fuel filter.

In one embodiment, the system includes an air purge valve in communication with the fuel storage volume for purging air from the system after the air has passed through the second outlet port of the air/fuel separator.

In one embodiment, the system is free of an airframe mounted boost pump.

A method of supplying fuel to a combustor of an aircraft having a fuel tank is provided. The method includes drawing fluid from the fuel tank using suction from a boost pump unit. The boost pump unit could take any form as outlined above. The method further includes returning fuel from the air/fuel separator to the liquid ring pump through the first outlet port. By returning the fuel, the liquid ring can be maintained.

In another method, the boost pump unit includes an inlet ejector. The method further includes utilizing the inlet ejector to improve suction at the pump inlet to draw fluid from the tank. In one method, the step of returning fuel from the air/fuel separator to the liquid ring pump provides the motive flow for the inlet ejector to provide suction.

One method further includes supplying an air/fuel mixture to the air/fuel separator from the liquid ring pump; separating the air/fuel mixture into a first portion that has a first fuel-to-air ratio and a second portion that has a second fuel-to-air ratio air using the air/fuel separator; dispensing the first portion through the first outlet port; and dispensing the second portion through the second outlet port. The first fuel-to-air ratio is greater than the second fuel-to-air ratio.

In one method, separating the air/fuel mixture includes passing the air/fuel mixture through the arcuate flow path such that the first portion with the higher fuel-to-air ratio is forced radially outward relative to the second portion with the lower fuel-to-air ratio. In some instances, the first portion could be primarily if not entirely fuel while the second portion could be primarily if not entirely air.

In one method, drawing fluid from the fuel tank is performed without the use of an airframe mounted pump.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
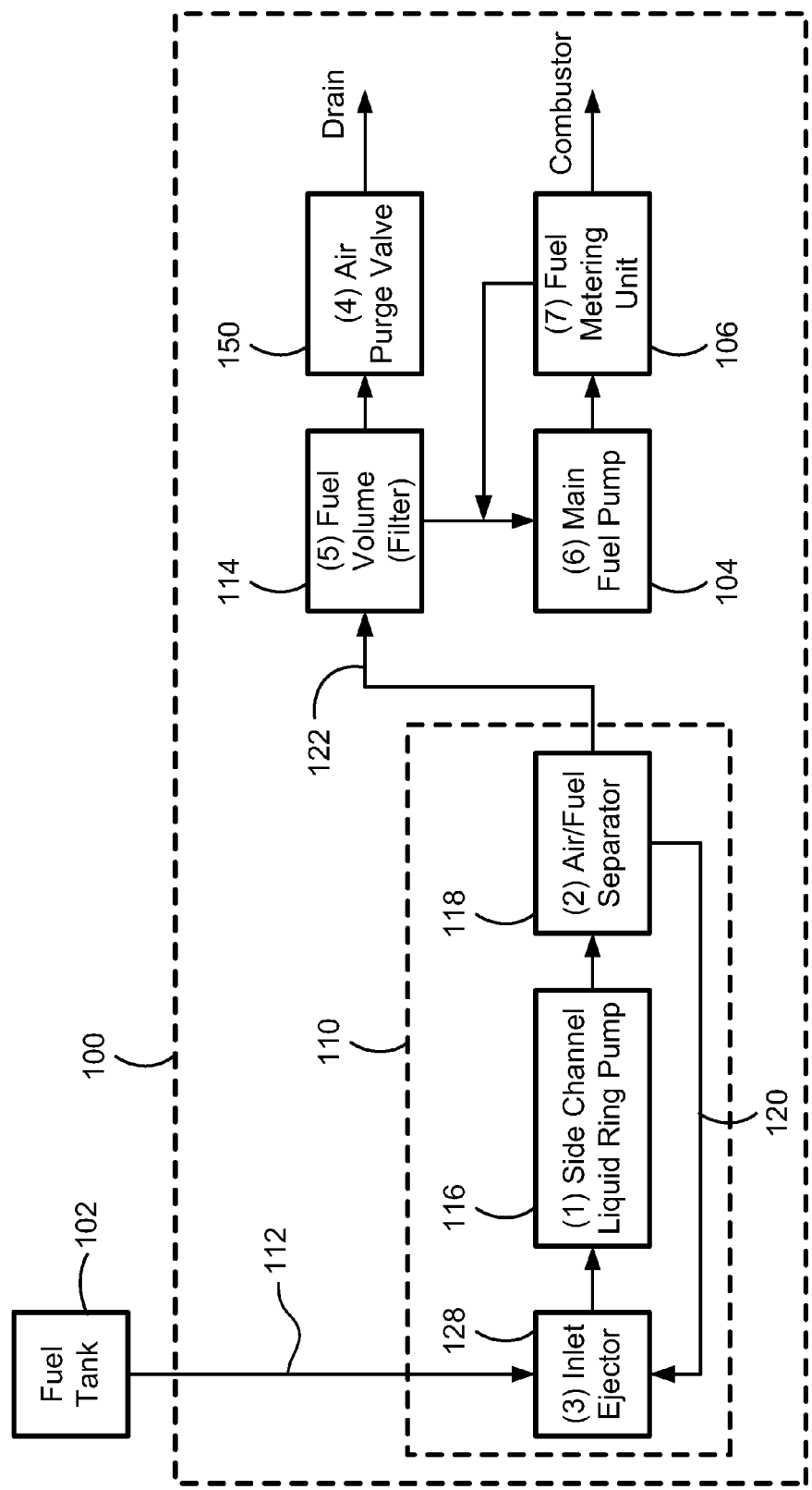
FIG. 1 is a schematic illustration of a fuel system according to an embodiment of the invention

An engine mounted fuel system 100 (hereinafter "fuel system 100") according to an embodiment of the invention is illustrated in schematic form in FIG. 1. The fuel system 100 cooperates with and draws fluid under suction from fuel tank 102. Preferably, but not necessarily, the fuel system 100 is configured such that an airframe, i.e. tank, mounted boost pump is not required. The fuel system 100 is configured to be self-priming.

The fuel system includes a self-priming boost pump unit 110 that provides the suction to draw fuel from fuel tank 102 via fuel inlet line 112. The self-priming boost pump unit 110 supplies low pressure fuel to a main fuel pump 104.

The main fuel pump 104 supplies pressurized fuel to a combustor (not shown) of the aircraft. To regulate fuel from the main fuel pump 104 to the combustor, the fuel system 100 includes a fuel metering unit 106. The fuel metering unit 106 allows fuel to flow to the combustor or recirculates fuel back to an inlet of the main fuel pump 104. For instance, the main fuel pump 104 may be a positive displacement pump.

A fuel filter 114 is interposed between the inlet side of the main fuel pump 104 and the outlet of the self-priming boost pump unit 110.

In one embodiment, the self-priming boost pump unit 110 includes a pump that can pump fuel, air or the combination of both fuel and air. In a preferred embodiment, the pump is a side channel liquid ring pump 116. A side channel liquid ring pump 116 provides air compression capabilities. This allows the fuel system 100 to ingest large quantities of air from the fuel inlet line 112 and compress it into a smaller volume. This allows the fuel system to be self-priming to be able to draw a vacuum and draw the fuel from the fuel tank 102. However, under normal operating conditions, i.e. when flow through the fuel inlet line 112 is solid fuel, the side channel liquid ring pump 116 behaves like a regenerative pump supplying boost pressure to the main fuel pump 104.

The side channel liquid ring pump compresses gas by rotating a vaned impeller located centrally in the pump casing. Fuel is fed into the pump and, by centrifugal acceleration, forms a moving cylindrical ring against the inside of the casing. This liquid ring creates a series of seals in the space between the impeller vanes, which form compression chambers. The side channel is arranged such that the area increases radially from the start of the inlet port to the end of the inlet port, causing the compression chamber to increase in volume as it rotates. The side channel is further arranged such that the area decreases from the start of the discharge port to the end of the discharge port, causing the compression chamber to decrease in volume as the compression chamber rotates through the discharge port.

During air pumping, such as during priming, air, is drawn into the pump via the inlet port in the casing. The gas is trapped in the compression chambers formed by the impeller vanes and the liquid ring. The reduction in volume caused by the impeller rotation compresses the gas, which reports to the discharge port in the end of the casing An air/fuel separator 118 is downstream from the side channel liquid ring pump 116. In a preferred embodiment, the air/fuel separator 118 is in the form of a centrifugal air fuel separator. When mixed fuel and air flow is supplied from the liquid ring pump 116 to the air/fuel separator 118, the air/fuel separator separates the liquid fuel from the air and returns a portion of the liquid fuel upstream of the side channel liquid ring pump 116 through return line 120 so as to maintain the liquid ring of fuel within the liquid ring pump 116. The separated air is allowed to flow downstream through supply line 122 to fuel filter 114.

Figure 3:
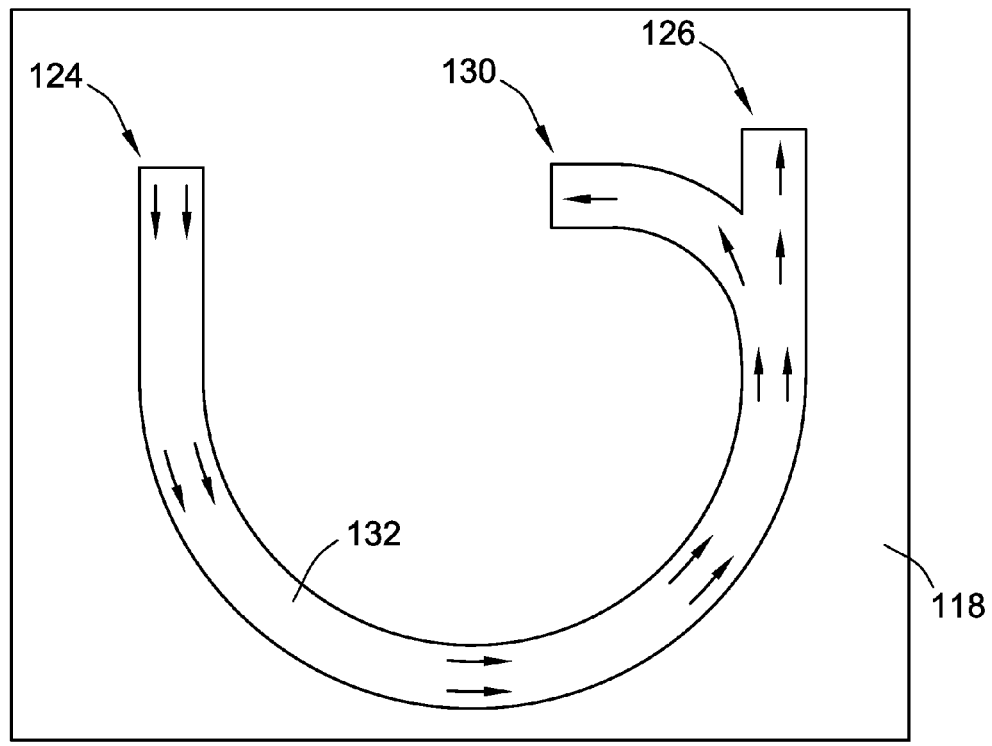
FIG. 3 is a simplified schematic illustration of the air/fuel separator of the system of FIG. 1 when operating in a normal state (e.g. full fuel flow).
Figure 2:
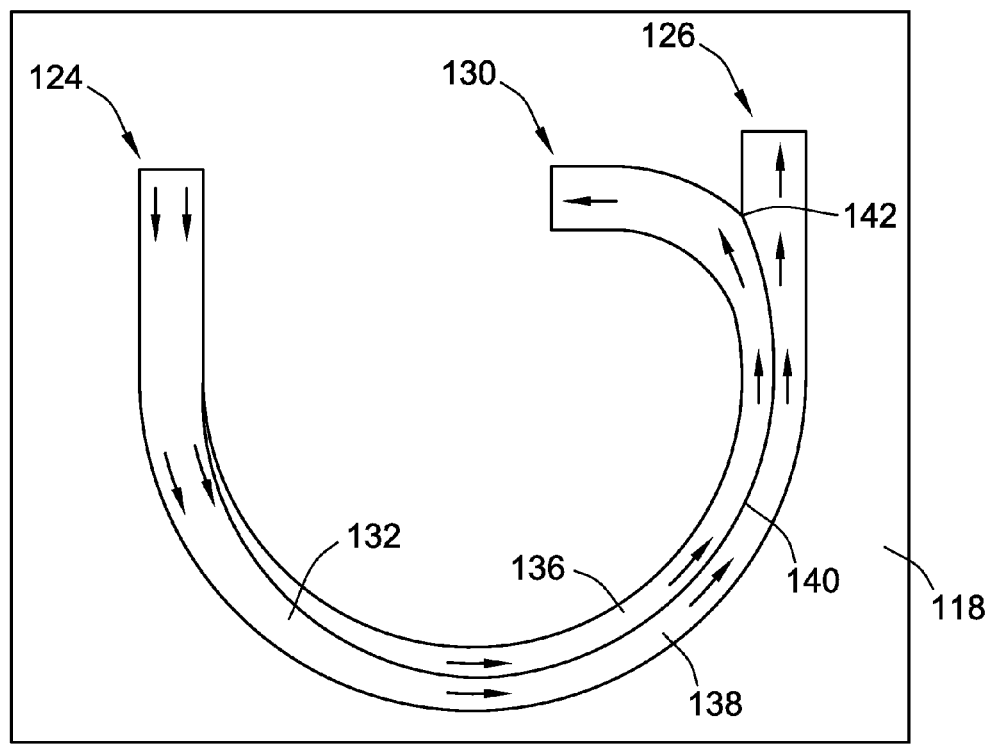
FIG. 2 is a simplified schematic illustration of the air/fuel separator of the system of FIG. 1 when operating in a mixed fuel-air state.

FIGS. 2 and 3 are schematic illustrations of the air/fuel separator 118 under two-phase flow, e.g. during priming, (FIG. 2) and normal operating conditions, i.e. full fuel flow, (FIG. 3).

The air/fuel separator 118 includes an inlet 124 that receives fluid from the side channel liquid ring pump 116. The air/fuel separator 118 includes a first outlet port 126 through which that is fluidly coupled to return line 120 to fluid communicate upstream of side channel liquid ring pump 116. In the illustrated embodiment (see FIG. 1), the first outlet port 126 is connected by return line 120 to an inlet ejector 128. The air/fuel separator 118 includes a second outlet port 130 that is fluidly coupled to the fuel filter 114 by fuel supply line 122.

A fluid flow channel 132 is interposed between the inlet 124 and the first and second outlet ports 126, 130. The fluid flow channel 132 forms an arcuate path.

With reference to FIG. 2, mixed fuel and air flow from the side channel liquid ring pump 116 into the air/fuel separator 118 at inlet 124. As the mixed flow flows through the arcuate fluid flow channel 132, the mixed flow is accelerated on a radius which results in a pressure gradient that acts on the mixture. Liquid fuel is forced to the outer diameter of the curved fluid flow channel 132 while air collects at the inner diameter of the curved flow channel 132 forming two separate discrete flows illustrated by air flow 136 and fuel flow 138 separated by a hypothetical separation line 140. As such, the air/fuel separator 118 separates the mixed flow into a first portion having a first fuel-to-air ratio and a second portion having second fuel-to-air ratio. The first fuel-to-air ratio is greater than the second fuel-to-air ratio.

The discrete flows are then split at junction 142 with the fuel flow 138 (e.g. the portion with the higher fuel-to-air ratio) flowing to the first outlet port 126 and back to the side channel liquid ring pump 116 through the return line 120 and inlet ejector 128. The air (e.g. portion with the lower fuel-to-air ratio) exits through the second outlet port 130 and travels downstream to the fuel filter 113 via supply line 122.

With reference to FIG. 3, solid fuel is supplied to the inlet 124. A portion of the solid fuel flow flows out each of the first and second outlet ports 126, 130. The flow that exits first outlet port 126 is again used recycled back to the inlet ejector 128. The flow that exits the second outlet port 130 flows to the fuel filter 114 and then on downstream through the main fuel pump 104 and ultimately to the combustor.

The inlet ejector 128 improves suction capability of the self-priming boost pump unit 110. It also improves air pumping capability by supplying fuel to the inlet of the side channel liquid ring pump 116 during air pumping events to maintain the liquid ring within the pump 116. Motive flow for the inlet ejector 128 is supplied by the side channel liquid ring pump via the air/fuel separator 118 via the first outlet port 126 and return line 120 as discussed above. If the suction capability is not needed, the inlet ejector can be replaced with an orifice to maintain the liquid ring within pump 116.

The fuel filter 114 functions to also provide a fuel storage volume to provide a temporary fuel reserve during an air handling event. The capacity of the fuel reserve within the fuel storage volume sets the limit on the volume of air that can be stored in the system without interrupting combustor flow.

The system 100 may include an optional air purge valve 150 that provides a vent to remove air from the system which increases the total mass of air that can be stored or handled by the system.

While a side channel liquid ring pump is the preferred pump for the fuel system 100, other liquid ring pumps could be incorporated.

In one embodiment, the air/fuel separator 118 is formed in a cover of the liquid ring pump.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A boost pump unit for an aircraft fuel system comprising:
    a liquid ring pump having an inlet and an outlet;
    an air/fuel separator having an inlet and first and second outlet ports, the inlet operably fluidly coupled to the outlet of the liquid ring pump, the air/fuel separator having an arcuate flow path extending from the inlet to the first and second outlet ports, wherein the first outlet port is in fluid communication with a radially outer portion of the arcuate flow path and the second outlet port is in fluid communication with a radially inner portion of the arcuate flow path;
    a return line connected directly to the first outlet port and configured to return fuel to the liquid ring pump.

2. The boost pump unit of claim 1, further comprising an inlet ejector for providing suction upstream of the liquid ring pump.

3. The boost pump unit of claim 2, wherein the return line is in fluid communication with the inlet ejector such that flow of fuel through the return line provides a motive flow for the inlet ejector.

4. The boost pump unit of claim 1, wherein the liquid ring pump is a side channel liquid ring pump.

5. The boost pump unit of claim 1, wherein the boost pump unit is self-priming and configured to pump air.

6. An engine mounted fuel system for an aircraft having a fuel tank, comprising:
 a main fuel pump;
 a boost pump unit for drawing fuel from the fuel tank and operably supplying it to the main fuel pump, the boost pump unit including:
  a liquid ring pump having an inlet and an outlet;
  an air/fuel separator having an inlet and first and second outlet ports, the inlet operably fluidly coupled to the outlet of the liquid ring pump, the air/fuel separator having an arcuate flow path extending from the inlet to the first and second outlet ports, wherein the first outlet port is in fluid communication with a radially outer portion of the arcuate flow path and the second outlet port is in fluid communication with a radially inner portion of the arcuate flow path; and
  a return line connected directly to the first outlet port and configured to return fuel to the liquid ring pump.

7. The fuel system of claim 6, further comprising an inlet ejector for providing a suction upstream of the liquid ring pump.

8. The fuel system of claim 7, wherein the return line is in fluid communication with the inlet ejector such that flow of fuel through the return line provides a motive flow for the inlet ejector.

9. The fuel system of claim 6, wherein the liquid ring pump is a side channel liquid ring pump.

10. The fuel system of claim 6, further comprising a fuel storage volume downstream from and in fluid communication with the second outlet port.

11. The fuel system of claim 10, further comprising an air purge valve in communication with the fuel storage volume for purging air from the system after the air has passed through the second outlet port of the air/fuel separator.

12. The fuel system of claim 10, wherein the fuel storage volume is an interstage fuel filter.

13. The fuel system of claim 6, wherein the system is free of an airframe mounted boost pump.

14. A method of supplying fuel to a combustor of an aircraft having a fuel tank, the method comprising:
 drawing fluid from the fuel tank using suction from a boost pump unit including:
  a liquid ring pump having an inlet and an outlet;
  an air/fuel separator having an inlet and first and second outlet ports, the inlet operably fluidly coupled to the outlet of the liquid ring pump, the air/fuel separator having an arcuate flow path extending from the inlet to the first and second outlet ports, wherein the first outlet port is in fluid communication with a radially outer portion of the arcuate flow path and the second outlet port is in fluid communication with a radially inner portion of the arcuate flow path;
  a return line connected directly to the first outlet port and configured to return fuel to the liquid ring pump; and
 returning fuel from the air/fuel separator to the liquid ring pump through the first outlet port.

15. The method of claim 14, wherein the boost pump unit includes an inlet ejector, the method further comprising:
 providing a suction and drawing fluid from the fuel tank using the inlet ejector.

16. The method of claim 15, wherein the step of returning fuel from the air/fuel separator to the liquid ring pump provides a motive flow for the inlet ejector to create suction.

17. The method of claim 14, further comprising:
 supplying an air/fuel mixture to the air/fuel separator from the liquid ring pump;
 separating the air/fuel mixture into a first portion having a first fuel-to-air ratio and a second portion having second fuel-to-air ratio using the air/fuel separator, the first fuel-to-air ratio being greater than the second fuel-to-air ratio;
 dispensing the first portion through the first outlet port; and
 dispensing the second portion through the second outlet port.

18. The method of claim 17, wherein separating the air/fuel mixture includes passing the air/fuel mixture through the arcuate flow path such that the first portion moves radially outward relative to the second portion.

19. The method of claim 14, wherein the boost pump unit is an engine mounted boost pump unit.

20. The method of claim 14, wherein the drawing fluid from the fuel tank is performed without the use of an airframe mounted pump.

* * * * *